United States Patent
Weber et al.

(10) Patent No.: US 9,640,078 B2
(45) Date of Patent: May 2, 2017

(54) AUTHORITY ISSUED SLOT ASSIGNMENT OPTIMIZATION

(71) Applicant: Amadeus S.A.S., Biot (FR)

(72) Inventors: Valentin Weber, Surry Hills (AU); Baptiste Chatrain, Waterloo (AU); Alexandre Salch, Antibes (FR); Gregoire Spiers, Paris (FR); Pranav Pandey, Juan les Pins (FR); Daniel Perez, Berlin (DE); Nigith Cherukudi Mattuvayil, Kerala (IN); Nagesha Yellur Jayarama, Karnataka (IN)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 14/744,512

(22) Filed: Jun. 19, 2015

(65) Prior Publication Data
US 2016/0371988 A1 Dec. 22, 2016

(51) Int. Cl.
G08G 5/00 (2006.01)
G08G 5/06 (2006.01)
G08G 1/123 (2006.01)

(52) U.S. Cl.
CPC .......... *G08G 5/0043* (2013.01); *G08G 5/003* (2013.01); *G08G 5/0026* (2013.01); *G08G 5/065* (2013.01); *G08G 1/123* (2013.01); *G08G 5/00* (2013.01)

(58) Field of Classification Search
CPC .... G08G 5/0043; G08G 5/0026; G08G 5/065; G08G 5/00; G08G 5/003; G08G 1/123
USPC .............................. 701/3, 14, 120
See application file for complete search history.

(56) References Cited

U.S. PATENT DOCUMENTS

| 6,049,754 | A | * | 4/2000 | Beaton | G01C 21/00 340/990 |
| 8,731,990 | B1 | * | 5/2014 | Osborne | G06Q 10/08 701/120 |
| 9,171,476 | B2 | * | 10/2015 | White | G08G 5/065 |
| 2003/0139875 | A1 | * | 7/2003 | Baiada | G08G 5/0043 701/120 |

(Continued)

FOREIGN PATENT DOCUMENTS

| EP | 1079204 A1 | 2/2001 |
| EP | 2172892 A1 | 4/2010 |

OTHER PUBLICATIONS

European Patent Office, Search Report issued in corresponding Application No. 15290162.5 dated Nov. 17, 2015, 7 pages.

*Primary Examiner* — Jason Holloway
(74) *Attorney, Agent, or Firm* — Thompson Hine LLP (57) ABSTRACT

An approach for identifying slot exchanges for flights among a schedule of an aircraft operator includes acquiring existing slot assignments and flight schedules for flights operated by any airline that participate in a slot exchange program for a particular controlled airspace. Cost values are assigned to slots of the aircraft operator based on various criteria, such as any difference between flight times of particular flights and corresponding assigned slots. An optimization is performed to identify any alternate authority issued slots that, if assigned to flights of the aircraft operator, result in reduced cost values. Slot exchange requests are issued for the alternate authority issued slots in a manner that facilitates acceptance of the request without user intervention, by either the send or receiving airline. Flight schedules and assigned slots may be represented on a common display.

20 Claims, 3 Drawing Sheets

(56) References Cited

U.S. PATENT DOCUMENTS

| | | | |
|---|---|---|---|
| 2003/0167109 A1* | 9/2003 | Clarke | G06Q 10/0631 701/3 |
| 2005/0246208 A1* | 11/2005 | Langerman | G06Q 10/025 705/5 |
| 2007/0005232 A1* | 1/2007 | Flynn | G01C 23/00 701/120 |
| 2009/0276250 A1* | 11/2009 | King | G06Q 10/02 705/5 |
| 2011/0251781 A1* | 10/2011 | Brennan | G08G 5/003 701/120 |
| 2012/0035965 A1* | 2/2012 | Maguire | G06Q 10/02 705/5 |
| 2012/0245836 A1* | 9/2012 | White | G08G 5/06 701/120 |

* cited by examiner

AUTHORITY ISSUED SLOT ASSIGNMENT OPTIMIZATION

TECHNICAL FIELD

The present invention relates generally to identifying alternate authority issued time slots for flights of an aircraft operator.

BACKGROUND

With increased air travel, organizations with authority over air space, such as for example EuroControl, the Federal Aviation Administration, Australian Air Services, and the Bay of Bengal Cooperative Air Traffic, have taken to issuing time windows or "slots" during which individual airplanes may pass through a controlled air space. Generally speaking, slots are issued for purposes of Air Traffic Flow Management (ATFM) to reduce air congestion and to promote safety. Controlled air spaces that are subject to such slots typically include air spaces designated for arrivals and/or departures at airports. Controlled air spaces may also, however, include en-route air space not associated with any particular airport.

Authorities or Air Service Network Providers (ANSP's) that issue slots typically do so on a first scheduled, first assigned basis. That is, slots are assigned in a chronological order that follows the chronology in which airplanes are initially scheduled to pass through a controlled air space. Disruptions, however, frequently occur and cause displacements between assigned slots and actual times at which an airplane should be present in a controlled air space to maintain a desired schedule. As may be appreciated, disruptions occur for various reasons. Actual flight schedules often change due to unexpected circumstances, such as weather based delays, equipment based delays, crew based delays, and the like. Moreover, an authority may reduce the number of available slots to slow the rate at which airplanes pass through a controlled space, such as when inclement weather is present or expected in the future. In such situations, Air Service Network Providers may reallocate slots for controlled airspace based on updated, actual flight schedules, as necessary, to accommodate such situations, again assigning slots on a first scheduled, first assigned basis.

Aircraft operators may exchange slots among flights in an operators own schedule as well as with flights of other aircraft operators. In this respect, aircraft operators may make efforts to better accommodate their own flight schedule and business goals. Programs have been established that facilitate the exchange of slots through rules set in Collaborative Decision Making (CDM) frameworks that allow individual aircraft operators to make slot exchanges outside of the first scheduled, first assigned system. In this respect, individual aircraft operators may attempt to better accommodate their own business objectives by exchanging slots with other aircraft operators, subject to any restrictions imposed by Collaborative Decision Making framework agreements.

Conventionally, aircraft operators employ multiple slot coordinators who review airline schedules and slot schedules to identify alternate slots that might improve the flight schedule of the airline. A slot coordinator may be provided with a view of an airline schedule and a separate view of slot assignments. When a potential slot exchange is identified, the slot coordinator may, under certain circumstances (e.g., when the other airline is not placed in a better condition by the exchange) contact his/her counterpart slot coordinator at another airline requesting a slot exchange for a particular flight. If an agreement is reached, the slot exchange may be executed.

DETAILED DESCRIPTION

Figure 1:
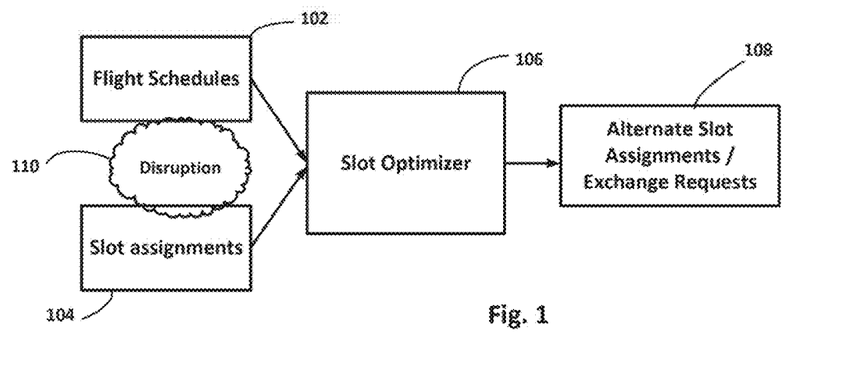
FIG. 1 is a diagram showing inputs and outputs to a system for optimizing slot assignments, according to an embodiment of the present disclosure.

Techniques described herein relate to identifying slot exchanges for flights among a schedule of an aircraft operator. Initially, slot assignments 104 and flight schedules 102 are obtained for flights operated by any airlines that participate in a slot exchange program for a particular controlled airspace, as shown in FIG. 1. Cost values may be assigned to flights of the aircraft operator based on various criteria, such as any difference between flight times of particular flights and corresponding, assigned slots. An optimization 106 may be performed in a manner similar to that of solving an assignment problem, to identify any alternate authority issued slots 108 that, if assigned to flights of the aircraft operator, result in reduced cost values. As disruptions 110 occur that alter flight schedules and/or slot assignments, the process is repeated. According to some example embodiments, slot exchange requests are issued for the alternate authority issued slots in a manner that facilitates acceptance of the request without user intervention, by either the sending or receiving airline.

Figure 2:
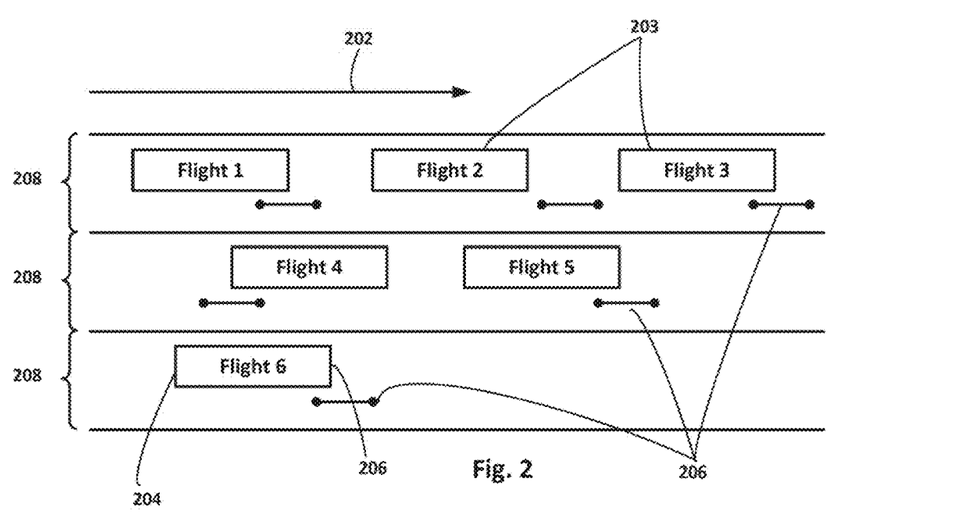
FIG. 2 shows a display that includes representations of both flight schedules and slot assignments, according to an embodiment of the present disclosure.

A user interface is also provided that, according to some example embodiments, displays features of both flight schedules and slot assignments in a common view, as reflected in FIG. 2. The display may include a horizontal time line axis 202. Flight representations 203 for flights among schedules of aircraft operators may be positioned on the display such that a beginning, left most portion 204 of the flight representations 203 are at a position with respect to the timeline that is consistent with the flight departure. Correspondingly, a right most portion 206 of the flight representations 203 may be positioned on the timeline consistent with flight arrival. Flights associated with a common airplane may be arranged on a common horizontal row 208 on the display, such that a scan from left to right across a row may show the whereabouts of an airplane at different positions along the timeline. Slot representations 206 are also included on the same display, positioned adjacent a flight time to which the corresponding slot is assigned. The horizontal length and positioning of the slot representations may be consistent with duration of the corresponding slot and times at which the slot opens and closes, respectively.

According to some example embodiments, aircraft operators accommodate mismatches between scheduled flight times (e.g., departure times, arrival times, and/or en-route times) and assigned slot times by adjusting an initial delay time for a flight according to a Ground Delay Program (GDP). That is, any time that an airplane may set idle at a boarding gate before pushing back and taxiing for takeoff may be adjusted by the aircraft operator such that the airplane arrives at the controlled airspace closer to or during the assigned time slot. Such approaches may even be employed where the initial delay is adjusted at an airport other than that associated with the authority issued slot, such as may be the case when the slot is associated with an arrival time at destination airport of a flight.

The applicant has appreciated that many Collaborative Decision Making frameworks include rules that obligate an aircraft operator to accept certain slot exchange requests. By way of example, aircraft operators may be obligated to accept slot exchange requests that reduce initial delay for a flight. Slot exchange requests that result in a reduced initial delay of for the flight of another airline may thus be sent and accepted without requiring user input by the aircraft operator that receives the request, at least when an electronic exchange system is in place. Automating the identification and sending of such requests enables multiple slot exchanges to take place without user intervention (i.e., human action), thus improving efficiency and timeliness of schedule optimization.

Techniques may, additionally or alternately, include optimizations that operate to maximize or minimize parameters other than costs associated with initial delays for flights of the aircraft operator. By way of non-limiting example, costs for individual flights may be weighted based on economic considerations associated with passengers on board particular flights. According to one embodiment, factors associated with passengers on a flight contribute, at least partially, to any cost value for the flight. Factors associated with passengers may relate to loyalty exhibited by the passengers to the airline, as measured through a loyalty rewards program, the relative price that passengers paid for tickets on the flight, the number of passengers on the flight, and/or the number of connecting flights that might be missed, should the flight be late to the destination airport.

Cost values assigned to flights of an aircraft operator may, additionally or alternatively, be based on timing related factors other than initial flight delay. According to some example embodiments, global delays and/or flight cancellations across the flight schedule of an aircraft operator may be minimized through the optimization process. According to other example embodiments, cost values may be weighted to minimize overall slot violations across the flight schedule of an aircraft operator. Typically, a slot violation is deemed to have occurred when a flight misses an assigned slot by more than a pre-determined amount of time, such as by more than 5 minutes, according to some embodiments. As may be appreciated, minimizing slot violations across a flight schedule of an aircraft operator may result in increased initial delays for some flights of the aircraft operator. Additional factors may be considered in the optimization process, as may be appreciated by those having skill in the art.

Optimization may also, according to some example embodiments, identify slot exchanges that do not improve the initial delay of the flight to which the slot is presently assigned. In such cases, a request may be provided and that is to be approved by a receiving airline to execute the slot exchange request. Such slot exchange requests, however, may be generated automatically and without user intervention on the part of the requesting aircraft operator, if the aircraft operator chooses to configure the system in such a manner. In such embodiments, the workload of any slot manager for the aircraft operator is reduced, although any slot manager for the aircraft operator receiving the slot exchange request may take action to accept or implement the slot exchange request that has been received.

Accepting a slot exchange request that does not reduce an initial delay of a flight may entail altering a flight time of the flight to which an alternate slot is presently assigned, depending on system configurations. According to some embodiments, aircraft operators may not be capable of overriding rules that provide for slot exchange requests to be accepted outside of situations where initial delay times are reduced. In such instances, an aircraft operator may alter a flight time of the flight to which the slot is presently assigned, such that the slot exchange would reduce the initial delay of the flight, thus allowing acceptance of the slot exchange request. It is to be appreciated that the term "flight time" as used herein, refers to any portion of a flight, during which an airplane is schedule to be in a particular geographic location. Examples of flight times include departure times, arrival times, and en-route times.

Optimization may be performed for slot assignments of flight schedules that span multiple controlled airspaces and/or airports. As may be appreciated, the flight schedule for an aircraft operator includes flights between multiple airports that may have controlled air spaces for departures and/or arrivals. Flight schedules may additionally include flights that pass through controlled air spaces en-route between origin and destination airports. Optimizations may be performed across the entire flight schedule of an aircraft operator in view of slot assignments for each controlled air space associated with flights of the airline. Alternately, optimization may be performed on a subset of the slots and flights times of the flight schedule, such as by performing optimization for arrivals at single airport.

Alternate slots that are identified through the optimization process for flights of an aircraft operator may be different types of slots. According to some example embodiments, optimizations may identify alternate slots that are presently unassigned to another airline. Exchanges for such slots may typically be made as a matter of right, and may be implemented without user intervention by any other aircraft operator. Optimization may also, according to some embodiments, identify alternate slots that are presently assigned to the same aircraft operator for which the optimization is performed. In such instances, rules may allow for the exchange of slots as a matter of right and without user intervention, even where the initial delay of the flight assigned to the alternate slot may be increased. Alternate slots may also include those assigned to flights of another airline, as described herein.

Various optimization routines may be employed to identify alternate slots among flights of an aircraft operator, although routines associated with solving an assignment problem may be readily suited to the task. According to some example embodiments, a Hungarian algorithm is used to optimize slot assignments. To apply the Hungarian algorithm, cost values are assigned to each slot and flight paring. The costs values may be a function of initial delay, at least for slots assigned to the same airline. Costs values assigned to slot and flight parings of the aircraft operator for which the optimization is performed may be a function of initial delay among other factors included in the optimization. Some other factors may include passenger related information, global delay information, slot violation information, and the like, as described herein. Unassigned slots maybe provided a zero cost value, according to some example embodiments. The Hungarian algorithm then works to identify alternate slot and flight parings that result in a reduced cost value. This is performed through optimization in polynomial time by minimizing cost values in view of any applied constraints. It is to be appreciated that the Hungarian algorithm is but one optimization routine that may be utilized, and that others including primal simplex algorithms, auction algorithms, and greedy approximation algorithms may alternately be used.

Figure 3A:
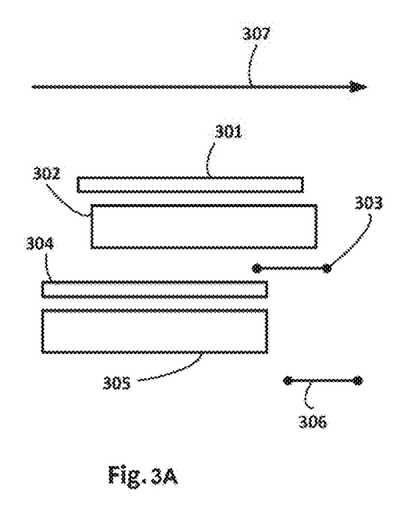
FIGS. 3A and 3B show representations for scheduled flight times, estimated flight times, and assigned slots involved in slot exchange, according to an embodiment of the present disclosure.

As discussed herein with respect to FIG. 2, various example embodiments may include a user interface that displays representations of flights in a flight schedule. In the embodiment of FIG. 3A, a first flight representation includes a scheduled flight representation 301 and an estimated flight representation 302. The scheduled flight time is positioned on a timeline 307 of the display to reflect the originally scheduled departure and arrival times for the flight while the estimated flight representation 302 is positioned to reflect any changes in departure and arrival times that are expected due to disruptions. In the illustrated embodiment, estimated flight representation 302 is shifted to the right along the timeline 307 to reflect a flight delay. FIG. 3A also shows a scheduled flight representation 304 and estimated flight representation 305 for a second flight that is operating according to schedule, as may be determined by the position of the scheduled and estimated flight representations 304, 305, relative to one another and/or timeline 307.

Figure 3B:
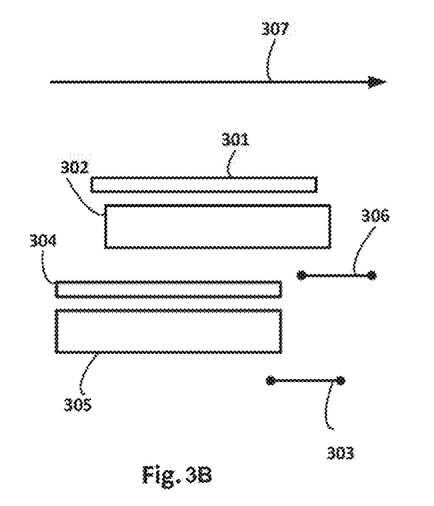

FIG. 3A also shows representations for slots that have been assigned to each of the represented flights. As may be seen, representation 303 is for a slot that is assigned to the flight associated with scheduled flight 301 while representation 306 is for a slot that is assigned to the flight associated with scheduled flight 304. The duration and time for each slot 303, 306 may be gleaned from the length and positioning of each representation relative to timeline 307, in a similar manner as flight representations. In FIG. 3A, slot representation 306 lacks any overlap along timeline 307 with flight representation 305, indicating that the flight associated with representation 305 will incur a slot violation. FIG. 3B, however, reflects a situation after slots of representations 303 and 306 have been exchanged between flights to eliminate the slot violation. As may be appreciated, such a slot exchange may be identified and implemented automatically through the slot optimization process described herein.

According to some example embodiments, slot exchanges that are identified through an optimization process may or may not be presented to a slot manager of an airline for consideration and/or approval, prior to being requested. In such embodiments, an alert may highlight or illustrate a potentially beneficial slot exchange directly on the flight schedule and slot assignment for a slot manager to consider. Alerts may be visual and/or audible. According to some embodiments, slot and/or flight representations associated with an identified slot exchange may change color or flash to draw the attention of the slot manager. Additionally or alternately, animations may illustrate identified slot exchanges for a slot manager, such as by moving slot representations on the display to reflect the slot exchange without actually executing the slot exchange. This may allow a slot manager to visualize the impacts of a slot exchange prior to approval of the slot exchange and/or slot exchange request.

Figure 4:
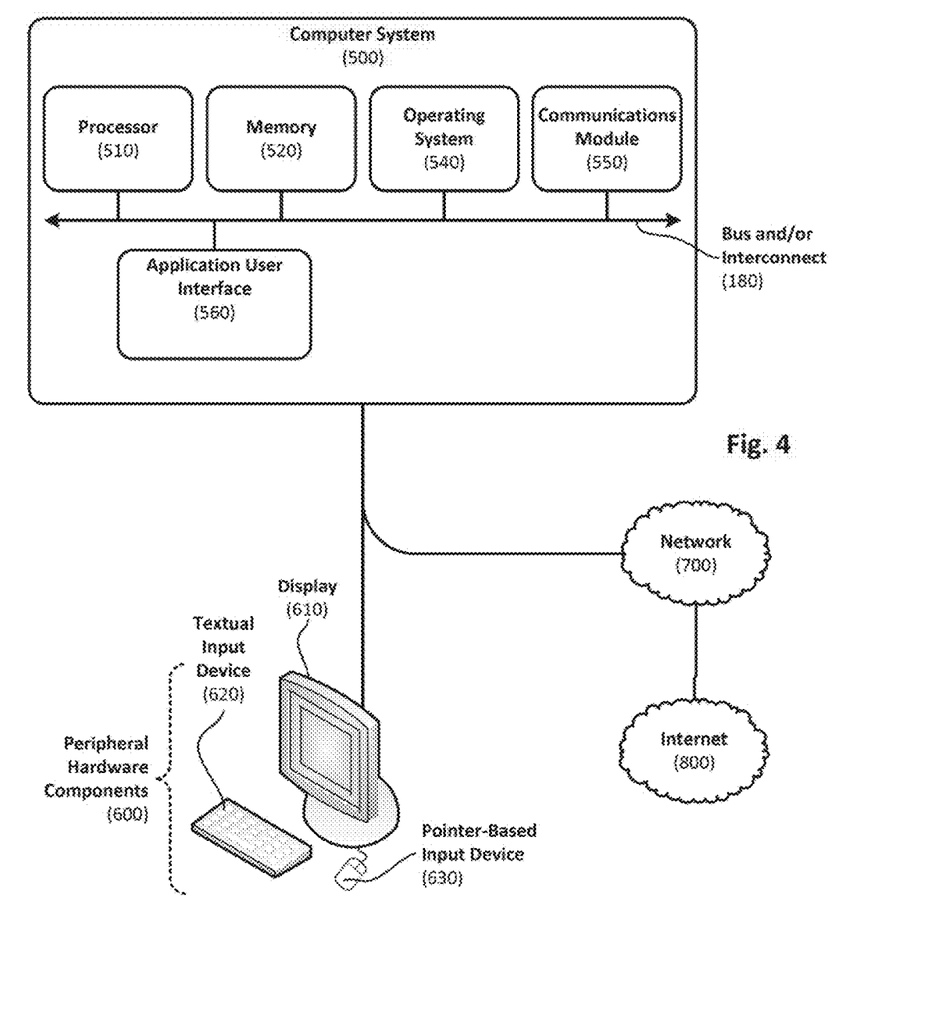
FIG. 4 shows an example system that may be used for optimizing slot assignments, in accordance with an embodiment of the present disclosure.

FIG. 4 is a block diagram schematically illustrating selected components of an example computer system 500 that can be used to implement a slot optimizer, according to some embodiments. Computer system 500 may comprise, for example, one or more devices selected from a desktop computer, a laptop computer, a workstation, a tablet computer, a smartphone, a handheld computer, an enterprise class server, or any other such computing device. A combination of different devices may be used in certain embodiments. In the illustrated embodiment, computer system 500 includes, among other things, a processor 510, a memory 520, an operating system 540, a communications module 550, an application user interface 560, and a local image repository 570. As can be further seen, a bus and/or interconnect 580 is also provided to allow for inter- and intra-device communications using, for example, communications module 550.

Depending on the particular type of device used for implementation, computer system 600 is optionally coupled to or otherwise implemented in conjunction with one or more peripheral hardware components 600. Examples of peripheral hardware components 600 include a display 610, a textual input device 620 (such as a keyboard), and a pointer-based input device 630 (such as a mouse). One or more other input/output devices, such as a touch sensitive display, a speaker, a printer, or a microphone, can be used in other embodiments. For example, in a particular alternative embodiment wherein computer system 500 is implemented in the form of a tablet computer, functionality associated with the particular peripheral hardware components 600 illustrated in FIG. 4 is provided instead by a touch sensitive surface that forms part of the tablet computer. In general, computer system 500 may be coupled to a network 700 to allow for communications with other computing devices or resources, such as the internet 800. Other componentry and functionality not reflected in the schematic block diagram of FIG. 4 will be apparent in light of this disclosure, and thus it will be appreciated that other embodiments are not limited to any particular hardware configuration.

Processor 510 can be any suitable processor, and may include one or more coprocessors or controllers, such as an audio processor or a graphics processing unit, to assist in control and processing operations associated with computer system 500. Memory 520 can be implemented using any suitable type of digital storage, such as one or more of a disc drive, a universal serial bus (USB) drive, flash memory, and/or random access memory (RAM). Operating system 540 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with computer system 500, and therefore may also be implemented using any suitable existing or subsequently-developed platform. Communications module 550 can be any appropriate network chip or chipset which allows for wired and/or wireless connection to other components of computer system 500, and/or to network 800, thereby enabling computer system 500 to communicate with other local and/or remote computer systems, servers, and/or resources.

Application user interface 560 is configured to provide a user interface that is capable of providing information to, and receiving information from, a user of computer system 500. The provided user interface can be implemented using, or otherwise used in conjunction with, peripheral hardware components 600. Application user interface 560 can be installed local to computer system 500, as shown in the example embodiment of FIG. 4. However, in alternative embodiments, computer system 500 is implemented in a client-server arrangement wherein at least some potions of application user interface 560 are provided to computer system 500 using an applet (for example, a JavaScript applet) or other downloadable module. Such a remotely-provisioned module can be provided in real-time in response to a request from computer system 500 for access to a server having resources that are of interest to the user of computer system 500. Examples of such resources include a cloud-based repository of images or other content that the user wishes to manipulate. The server, if applicable, may be local to network 700 or may be remotely coupled to network 700 by one or more other networks or communication channels. In any such standalone or networked computing scenarios, application user interface 560 can be implemented with any suitable combination of technologies that allow a user to interact with computer system 500. In one particular example embodiment application user interface 560 is provided by an image editing software application such as Adobe Photoshop.

The embodiments disclosed herein can be implemented in various forms of hardware, software, firmware, or special purpose processors. For example, in one embodiment a non-transitory computer readable medium has instructions encoded thereon that, when executed by one or more processors, cause one or more of the digital image manipulation methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented using JavaScript or another suitable browser-based technology.

The functionalities disclosed herein can optionally be incorporated into a variety of different software applications, such as image editing software applications, word processing applications, desktop publishing applications, and presentation applications. The computer software applications disclosed herein may include a number of different modules, sub-modules, or other components of distinct functionality, and can provide information to, or receive information from, still other components and services. These modules can be used, for example, to communicate with peripheral hardware components 600, networked storage resources such as networked image repository 800, or other external components. More generally, other components and functionality not reflected in the illustrations will be apparent in light of this disclosure, and it will be appreciated that the present disclosure is not intended to be limited to any particular hardware or software configuration. Thus in other embodiments the components illustrated in FIG. 4 may comprise additional, fewer, or alternative subcomponents.

The aforementioned non-transitory computer readable medium may be any suitable medium for storing digital information, such as a hard drive, a server, a flash memory, or random access memory. In alternative embodiments, the computer and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input and output ports for receiving and transmitting data, respectively, and a number of embedded routines for carrying out the various functionalities disclosed herein. It will be apparent that any suitable combination of hardware, software, and firmware can be used, and that the present disclosure is not intended to be limited to any particular system architecture.

Numerous variations and configurations will be apparent in light of this disclosure. For instance, example embodiment 1 provides a non-transitory computer program product having instructions encoded thereon that when executed by one or more processors cause a process to be carried out for automatically generating exchange requests for assignment of authority issued slots for flights operated by an aircraft operator participating in a slot exchange program for a plurality of aircraft operators. The process comprises acquiring a schedule of flights operated by the plurality of aircraft operators at an airport. The schedule includes at least departure times at the airport and arrival times at the airport. Authority issued slot information is acquired for the schedule of flights at the airport including slot assignments among the schedule of flights and unassigned slots. Cost values associated with flights of the aircraft operator are calculated by identifying differences between flight times of the flights of the aircraft operator and slot times of slots assigned to the flights of the aircraft operator. Alternate authority issued slots are identified that reduce cost values for at least some of the flights of the aircraft operator when assigned to the at least some of the flights. Slot exchange requests are automatically issued, without user intervention, through the slot exchange program to assign the alternate authority issued slots to the at least some of the flights of the aircraft operator.

Example 2 includes the subject matter of example embodiment 1, and further provides identifying alternate authority issued slots that reduce cost values includes identifying delay times for flights of the alternate authority issued slots and wherein automatically issuing slot exchange requests includes automatically issuing slots that reduce delay times for any flights of other aircraft operators assigned to the alternate authority issued slots.

Example 3 includes the subject matter of example embodiment 2, and further provides that identifying delay times includes calculating delay times by assessing a difference between an initial off block time and a calculated off block time for flights of the alternate authority issued slots.

Example 4 includes the subject matter of example embodiment 1, and further provides that automatically issuing slot exchange requests includes automatically issuing slot exchange requests that alter delay times for flights of other aircraft operators currently assigned to the alternate authority issued slots. In further examples, the automatically issuing slot exchange requests includes automatically issuing slot exchange requests that shorten or lengthen delay times for flights of other aircraft operators currently assigned to the alternate authority issued slots.

Example 5 includes the subject matter of example embodiment 4, and further provides issuing schedule change requests for flights of the other aircraft operators currently assigned to the alternate authority issued slots.

Example 6 includes the subject matter of example embodiment 1, and further provides that calculating cost values associated with flights of the aircraft operator includes calculating costs associated with passengers of flights of the aircraft operator missing connecting flights at the airport.

Example 7 includes the subject matter of example embodiment 1, and further provides that calculating cost values associated with flights of the aircraft operator includes calculating costs associated with a summation of delays of the flights of the aircraft operator.

Example 8 includes the subject matter of example embodiment 8, and further provides that calculating cost values associated with flights of the aircraft operator includes calculating costs associated with a summation of slot violations of the flights of the aircraft operator.

Example 9 includes the subject matter of example embodiment 1, and further provides that identifying alternate authority issued slots that reduce cost values for at least some of the flights of the aircraft operator includes applying a Hungarian optimization.

Example 10 includes the subject matter of example 1, and further includes providing a visual indicator for at least some of the alternate authority issued slots identified to reduce cost values for flights of the aircraft operator.

Example 11 includes the subject matter of example 2, and further provides displaying a time line and a flight representation for at least some of the schedule of flights operated by the plurality of aircraft operator. Each flight representation is positioned with a beginning of the flight representation positioned on the time line near a corresponding flight departure time and with an end of the flight representation positioned on the time line near a corresponding flight arrival time. A slot representation for each authority issued slot that is associated with one of the plurality of flights. Each slot representation is positioned on the time line near a corresponding slot time and the flight representation of a flight to which the slot is assigned. Providing the visual indicator includes providing a visual indicator near a corresponding flight representation and slot representation.

Example embodiment 12 includes the subject matter of example embodiment 11, and further provides that the visual indicator includes a change in color of at least one of the corresponding flight representations and slot representations.

Example embodiment 13 includes the subject matter of example embodiment 11, and further provides displaying a visual animation of at least some of the alternate authority issued slots being assigned to flights of the aircraft operator.

Example embodiment 14 includes the subject matter of example embodiment 11, and further provides acquiring the schedule of flights operated by the plurality of aircraft operators includes departure times and arrival times for multiple airports.

Example embodiment 15 includes the subject matter of example embodiment 2, and further at least one of arrival times and departure times at the two or more of the multiple airports are controlled with a ground delay program.

Example embodiment 16 includes the subject matter of example embodiment 13, and further provides that arrival times and departure times are controlled by a ground delay program at at least one of the multiple airports.

Example embodiment 17 includes the subject matter of example embodiment 1, and further provides that wherein acquiring the schedule of flights operated by the plurality of aircraft operators includes acquiring equipment information for at least some of the flights.

Example embodiment 18 provides a non-transitory computer program product having instructions encoded thereon that when executed by one or more processors cause a process to be carried out. The process comprises displaying a time line. The process also comprises displaying a flight representation for each of a plurality of flights of a flight schedule. Each flight representation is positioned with a beginning of the flight representation positioned on the time line near a corresponding flight departure time and with an end of the flight representation positioned on the time line near a corresponding flight arrival time. The process also includes a slot representation for each authority issued slot that is associated with one of the plurality of flights. Each slot representation is positioned on the time line near a corresponding slot time and the flight representation to which the slot representation is assigned. In response to receiving information of a slot violation, an alert indicator is displayed near at least one of the flight representation and slot representation associated with the identified slot exchange.

Example embodiment 19 includes the subject matter of example embodiment 18, and further provides that the visual indicator includes a change in color of at least one of the corresponding flight representations and slot representations.

Example embodiment 20 includes the subject matter of example embodiment 18, and further provides displaying a visual animation of at least some of the alternate authority issued slots being assigned to flights of the aircraft operator.

Some embodiments relate to a computer program that when executed by one or more processors cause a process to be carried out, the process comprising displaying: a time line; a flight representation for each of a plurality of flights of a flight schedule, each flight representation positioned with a beginning of the flight representation positioned on the time line near a corresponding flight departure time and with an end of the flight representation positioned on the time line near a corresponding flight arrival time; and a slot representation for each authority issued slot that is associated with one of the plurality of flights, each slot representation positioned on the time line near a corresponding slot time and the flight representation to which the slot representation is assigned; in response to identifying a slot exchange that reduces a cost to an aircraft operator, displaying an alert indicator near at least one of the flight representation and slot representation associated with the identified slot exchange. In some of these embodiments the visual indicator includes a change in color of at least one of the flight representation and slot representation associated with the identified slot exchange. In some of these embodiments a visual animation is displayed of executing the slot exchange of at least one of the flight representation and slot representation associated with the identified slot exchange.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method for generating a plurality of slot exchange request, the method comprising:
    acquiring, by one or more processors, a flight schedule for a plurality of flights operated by a first aircraft operator and a second aircraft operator at an airport;
    acquiring, by the one or more processors, slot information for the flight schedule at the airport, the slot information including authority-issued assigned slots currently assigned among the flight schedule;
    calculating, by the one or more processors, first cost values associated with flights of the first aircraft operator by identifying differences between a plurality of flight times for the flights of the first aircraft operator and a plurality of slot times for the authority-issued assigned slots currently assigned to the flights of the first aircraft operator;
    identifying, by the one or more processors as a first alternate authority-issued slot, a first one of the authority-issued assigned slots that is currently assigned to a second flight of the flights of the flight schedule and that would reduce at least one of the first cost values associated with the flights of the first aircraft operator if assigned to a first flight of the flights of the first aircraft operator; and
    automatically issuing, by the one or more processors, the slot exchange request through a slot exchange program, the slot exchange request requesting an assignment of the first alternate authority-issued slot to the first flight of the flights of the first aircraft operator and an assignment of the authority-issued assigned slot currently assigned to the first flight to the second flight.

2. The method of claim 1, wherein the second flight is of the second aircraft operator, and identifying the first alternate authority-issued slot includes:
    identifying a delay time for each of the flights of the second aircraft operator, wherein the assignment of the authority-issued assigned slot currently assigned to the first flight to the second flight reduces the delay time identified for the second flight.

3. The method of claim 2, wherein identifying the delay time for each flight of the second aircraft operator comprises:
assessing a difference between an initial off-block time and a calculated off-block time for the flights of the second aircraft operator.

4. The method of claim 1, wherein the second flight is one of the flights of the second aircraft operator, and identifying the first alternate-authority issued slot comprises:
identifying a delay time for each of the flights of the second aircraft operator, wherein the assignment of the authority-issued assigned slot currently assigned to the first flight to the second flight alters the delay time identified for the second flight.

5. The method of claim 4, further comprising:
determining whether the assignment of the authority-issued assigned slot currently assigned to the first flight to the second flight reduces the delay time identified for the second flight;
in response to determining that the assignment of the authority-issued assigned slot currently assigned to the first flight to the second flight reduces the delay time identified for the second flight, automatically accepting the slot exchange request on behalf of the second aircraft operator; and
in response to determining that the assignment of the authority-issued assigned slot currently assigned to the first flight to the second flight fails to reduce the delay time identified for the second flight, issuing a schedule change request for the second flight such that the assignment of the authority-issued assigned slot currently assigned to the first flight to the second flight reduces the delay time identified for the second flight.

6. The method of claim 1, wherein calculating the first cost values associated with the flights of the first aircraft operator comprises:
calculating costs associated with a plurality of passengers of the flights of the first aircraft operator missing connecting flights at the airport.

7. The method of claim 1, wherein calculating the first cost values associated with the flights of the first aircraft operator comprises:
calculating costs associated with a summation of a plurality of delays of the flights of the first aircraft operator.

8. The method of claim 1, wherein calculating the first cost values associated with the flights of the first aircraft operator comprises:
calculating costs associated with a summation of a plurality of slot violations of the flights of the first aircraft operator.

9. The method of claim 1, further comprising:
assigning a plurality of second cost values to each of the flights of the first aircraft operator, each second cost value being based on a different one of the authority-issued assigned slots being assigned to the flight,
wherein identifying the first alternate authority-issued slot that would reduce at least one of the first cost values associated with the flights of the first aircraft operator comprises:
applying a Hungarian optimization to the first costs and the second costs assigned to each flight.

10. The method of claim 1, further comprising:
identifying, as a second alternate authority-issued slot, a second one of the authority-issued assigned slots that is currently assigned to a fourth flight of the flights of the flight schedule and that would reduce at least one of the first cost values associated with the flights of the first aircraft operator if applied to a third flight of the flights of the first aircraft operator; and
in response to identifying the second alternate authority-issued slot, providing a visual indicator for the second alternate authority-issued slots.

11. The method of claim 10, further comprising:
displaying:
a time line;
a flight representation for each of at least some of the flights operated by the first and second aircraft operators, the at least some of the flights including the third flight and the fourth flight, each flight representation positioned with a beginning of the flight representation positioned on the time line near a corresponding flight departure time and with an end of the flight representation positioned on the time line near a corresponding flight arrival time; and
a slot representation for each of the authority-issued assigned slots that is currently assigned to one of the at least some flights, each slot representation positioned on the time line near a corresponding slot time and the flight representation of the flight to which the authority-issued assigned slot is currently assigned,
wherein providing the visual indicator includes providing the visual indicator near at least one of the flight representation corresponding to the third flight and the flight representation corresponding to the fourth flight.

12. The method of claim 11, wherein the visual indicator includes a change in color of at least one of the flight representation for the third flight, the flight representation for the fourth flight, the slot representation for the authority-issued assigned slot currently assigned to the third flight, and the slot representation for the authority-issued assigned slot currently assigned to the fourth flight.

13. The method of claim 11, further comprising:
displaying a visual animation of the second alternate authority-issued slot being assigned to the third flight of the first aircraft operator.

14. The method of claim 1, wherein acquiring the flight schedule operated by the first and second aircraft operators includes acquiring departure times and arrival times for a plurality of airports.

15. The method of claim 14, wherein at least one of arrival times and at least one of the departure times at two or more of the airports is controlled with a ground delay program.

16. The method of claim 14, wherein the arrival times and the departure times are controlled by a ground delay program at at least one of the airports.

17. The method of claim 1, wherein acquiring the flight schedule operated by the first and second aircraft operators includes acquiring equipment information for at least some of the flights.

18. A system comprising:
one or more processors; and
a memory coupled to the one or more processors, the memory comprising program code stored thereon, and the program code configured to be executed by the one or more processors to cause the system to:
acquire a flight schedule for a plurality of flights operated by a first aircraft operator and a second aircraft operator at an airport;
acquire slot information for the flight schedule at the airport, the slot information including authority-issued assigned slots currently assigned among the flight schedule;

calculate a plurality of cost values associated with flights of the first aircraft operator by identifying differences between a plurality of flight times for the flights of the first aircraft operator and a plurality of slot times for the authority-issued assigned slots currently assigned to the flights of the first aircraft operator;

identify, as an alternate authority-issued slot, one of the authority-issued assigned slots that is currently assigned to a second flight of the flights of the flight schedule and that would reduce at least one of the cost values associated with the flights of the first aircraft operator if assigned to a first flight of the flights of the first aircraft operator; and automatically issue a slot exchange request through a slot exchange program, the slot exchange request requesting an assignment of the alternate authority-issued slot to the first flight of the flights of the first aircraft operator and an assignment of the authority-issued assigned slot currently assigned to the first flight to the second flight.

19. A computer program product comprising:

a non-transitory computer readable storage medium; and program code stored on the non-transitory computer readable storage medium and configured, upon execution, to cause one or more processors to:

acquire a flight schedule for a plurality of flights operated by a first aircraft operator and a second aircraft operator at an airport;

acquire slot information for the flight schedule at the airport, the slot information including authority-issued assigned slots currently assigned among the flight schedule;

calculate a plurality of cost values associated with flights of the first aircraft operator by identifying differences between a plurality of flight times for the flights of the first aircraft operator and a plurality of slot times for the authority-issued assigned slots currently assigned to the flights of the first aircraft operator;

identify, as an alternate authority-issued slot, one of the authority-issued assigned slots that is currently assigned to a second flight of the flights of the flight schedule and that would reduce at least one of the cost values associated with the flights of the first aircraft operator if assigned to a first flight of the flights of the first aircraft operator; and in response to the alternate authority-issued slot being identified, automatically issue a slot exchange request through a slot exchange program, the slot exchange request requesting an assignment of the the alternate authority-issued slot to the first flight of the flights of the first aircraft operator and an assignment of the authority-issued assigned slot currently assigned to the first flight to the second flight.

20. The method of claim 4, further comprising:

determining whether the assignment of the authority-issued assigned slot currently assigned to the first flight to the second flight reduces the delay time identified for the second flight;

in response to determining that the assignment of the authority-issued assigned slot currently assigned to the first flight to the second flight reduces the delay time identified for the second flight, automatically accepting the slot exchange request on behalf of the second aircraft operator; and in response to determining that the assignment of the authority-issued assigned slot currently assigned to the first flight to the second flight fails to reduce the delay time identified for the second flight, request a manual authorization for the slot exchange request from the second aircraft operator.

\* \* \* \* \*

UNITED STATES PATENT AND TRADEMARK OFFICE
CERTIFICATE OF CORRECTION

| | | |
|---|---|---|
| PATENT NO. | : 9,640,078 B2 | Page 1 of 1 |
| APPLICATION NO. | : 14/744512 | |
| DATED | : May 2, 2017 | |
| INVENTOR(S) | : Valentin Weber et al. | |

It is certified that error appears in the above-identified patent and that said Letters Patent is hereby corrected as shown below:

In the Claims

Column 12, Claim 1, Line 29: after "a", remove --plurality of--

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*